United States Patent [19]
Arenhold

[11] Patent Number: 5,651,566
[45] Date of Patent: Jul. 29, 1997

[54] CONTOURED-PART ARRANGEMENT AT A WHEEL CUT-OUT OF A CAR

[76] Inventor: Knut Arenhold, Westend 7, 22605 Hamburg, Germany

[21] Appl. No.: 445,507

[22] Filed: May 22, 1995

[30] Foreign Application Priority Data

May 27, 1994 [DE] Germany .................. 44 19 378.5

[51] Int. Cl.$^6$ .................................................. B62D 25/16
[52] U.S. Cl. ........................... 280/850; 280/848; 296/41
[58] Field of Search .................. 280/848, 850, 280/160, 849; 296/41, 39.1, 199; 293/112, 143, 144

[56] References Cited

U.S. PATENT DOCUMENTS

| | | | |
|---|---|---|---|
| D. 130,544 | 11/1941 | Wohlfield | 280/848 |
| 2,282,443 | 5/1942 | Wilson | 280/853 |
| 4,215,873 | 8/1980 | Price | 280/848 |
| 4,572,558 | 2/1986 | Chupick | 280/850 |
| 5,340,154 | 8/1994 | Scott | 280/848 |

FOREIGN PATENT DOCUMENTS

| | | | |
|---|---|---|---|
| 736027 | 11/1932 | France . | |
| 2679845 | 2/1993 | France | 296/41 |
| 2203721 | 8/1973 | Germany | 280/848 |
| 60-148777 | 8/1985 | Japan . | |

*Primary Examiner*—Anne Marie Boehler
*Attorney, Agent, or Firm*—Griffin, Butler, Whisenhunt & Kurtossy

[57] ABSTRACT

A contoured-part arrangement (10) at a wheel cut-out of a car, which extends along at least one third, preferably at least two thirds, of an edge (5) of the car body defining the wheel cut-out, protrudes outwardly, with an outer region (14) extending beyond the edge defining the wheel cut-out. The contoured-part arrangement is composed of strip-shaped sections (11, 12, 13) made from deformable material which are arranged with their adjacent ends overlapping one another and which have, in a direction of their longitudinal extension, a pre-formed curvature, a curvature center line being essentially parallel to a rotational axis of the associated wheel (1).

18 Claims, 4 Drawing Sheets

5,651,566

CONTOURED-PART ARRANGEMENT AT A WHEEL CUT-OUT OF A CAR

BACKGROUND OF THE INVENTION

The invention relates to a molded- (or contoured-) part arrangement on a wheel cut-out of a motor car extending over at least one third, preferably at least two thirds, of the length of an edge of the car body defining the wheel cut-out and having an outer region, protruding outwardly beyond an outer-most portion of the car-body edge defining the wheel cut-out.

Known molded-part arrangements, or contoured-part arrangements, of this type, which extend over the length of an entire wheel cut-out and which serve, for example, to broaden a wheel housing, at least optically, and to effect a certain protection against impacts of doors of adjacently parked vehicles, usually consist of an injection molded part, a deep-drawn part or a compression-molded part which was specially prepared for a type of car in question and which has an essentially rigid structure. Such contoured-part arrangements are therefore relatively expensive, since, on the one hand, wheel cut-outs of different types of cars are, in general, differently shaped, so that a contoured-part arrangement for one type of car does not fit another type of car, and since, on the other hand, differently shaped contoured-part arrangements are also required for one car, with contoured-part arrangements differing for right-hand and left-hand wheel cut-outs, and also for front and rear wheel cut-outs. Thus, considerable molding costs must be invested in order to produce the known contoured-part arrangements for a single type of car alone.

Furthermore, the known contoured-part arrangements are very bulky and require relatively large storage spaces, storage additionally being made more expensive because, as mentioned above, differently shaped contoured-part arrangements must be provided for different types of cars.

It is an object of the invention to provide a contoured-part arrangement to protect the body of a car against impacts of doors of adjacently parked vehicles, and the like, which contoured-part arrangement can be produced simply and inexpensively and which allows different types of cars to be fitted at lower molding costs.

SUMMARY OF THE INVENTION

According to principles of this invention, a contoured-part arrangement of the type mentioned in the introductory paragraph includes a combination of strip-shaped sections made from shapeable, or moldable, material which are arranged with their neighboring ends overlapping one another and which have, in a direction of their longitudinal extension, a pre-formed curvature having a curvature centre line essentially parallel to a rotational axis of an associated wheel. The contoured-part arrangement preferably extends about an entire edge defining a wheel cut-out.

BRIEF DESCRIPTION OF THE DRAWING

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
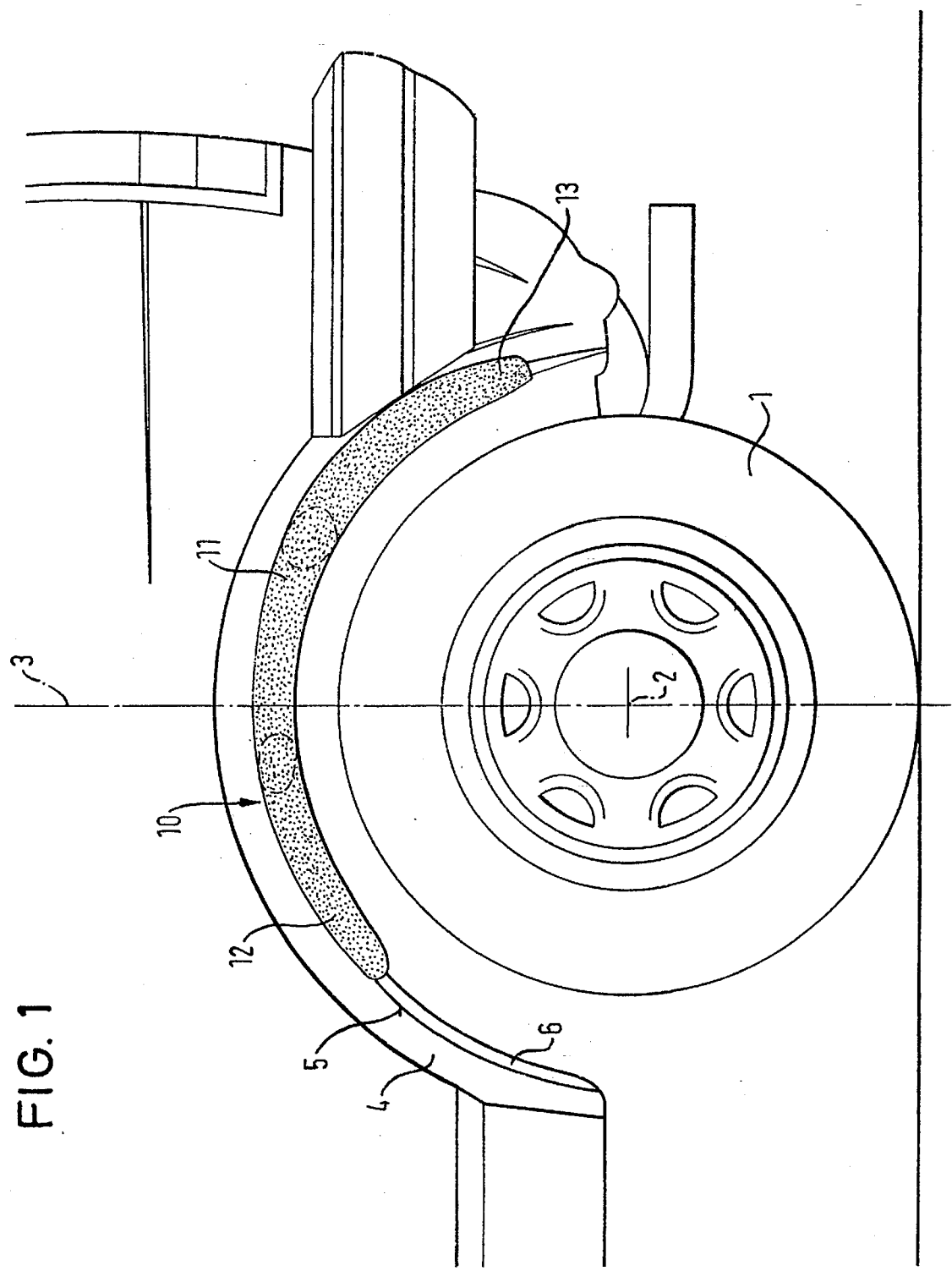
FIG. 1 is a schematic, segmented, side view of a rear left-hand wheel cut-out of a motor car, including a tire in the cut-out.
Figure 2:
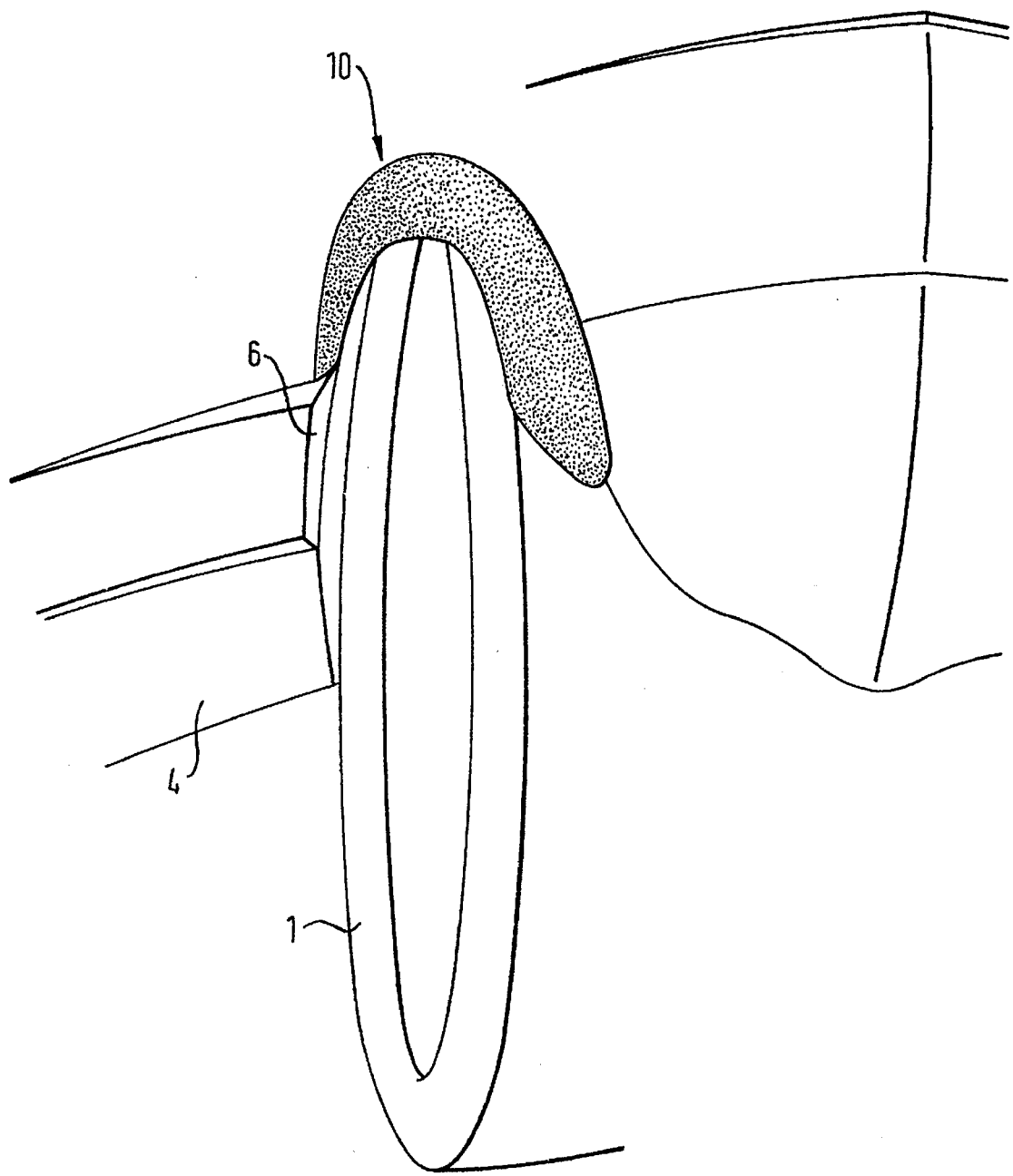
FIG. 2 is a schematic, segmented, isometric representation of the wheel cut-out of FIG. 1, as seen obliquely from the rear.

The region of a motor car depicted schematically in FIGS. 1 and 2 is a left-hand rear wheel, or tire, 1 which is rotatable about its rotational axis 2 and which is located within a wheel housing formed by a car body having a wheel cut-out recognizable in FIG. 1. This wheel cut-out is defined by a car body edge 5 at which an outer side wall 4 intersects and from which a normal wing flap 6 extends inwardly to form an obtuse angle with the side wall 4, this being more clearly shown in FIGS. 3 and 4.

Attached to the car body in the region of the wheel cut-out is a contoured-part arrangement 10 which extends to both sides of a perpendicular 3 through the rotational axis 2 of the wheel 1 and which covers noticeably more than a third of the car body edge 5. As is shown in FIG. 1, the contoured-part arrangement 10 includes a middle section 11, a front end-section 12 and a rear end-section 13. Neighboring end-regions of sections 11, 12, 13 have material thicknesses, or cross-sections, which taper toward their free ends, the free ends being rounded. In this way the neighboring ends overlap at overlapping tapered junctions, resulting in an essentially continuous outer surface being produced.

Figure 3:
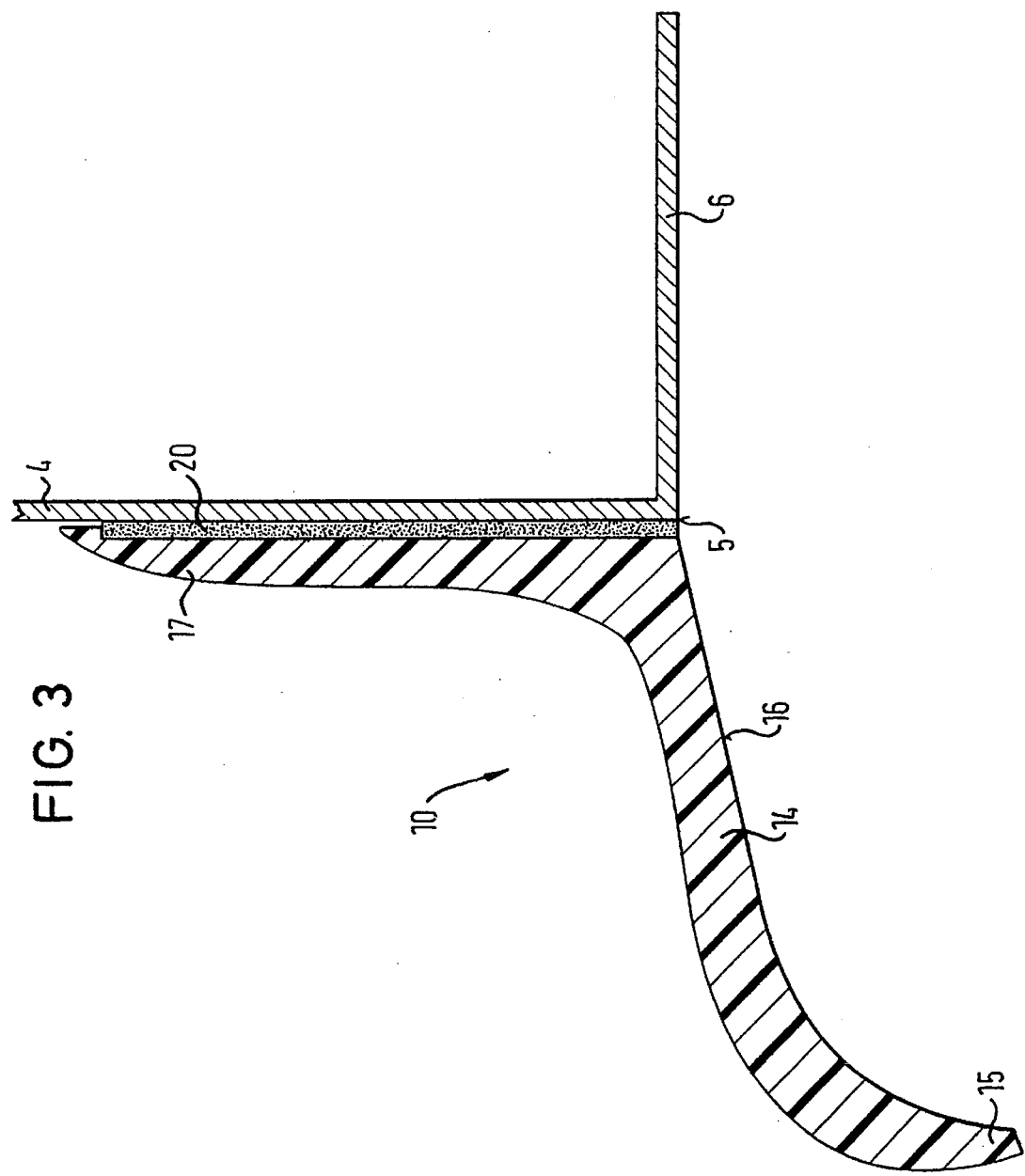
FIG. 3 is a cross sectional view taken through a peripheral region of the wheel cut-out of FIGS. 1 and 2 and through that region of the contoured-part arrangement attached to it which has a maximum cross-section.
Figure 4:
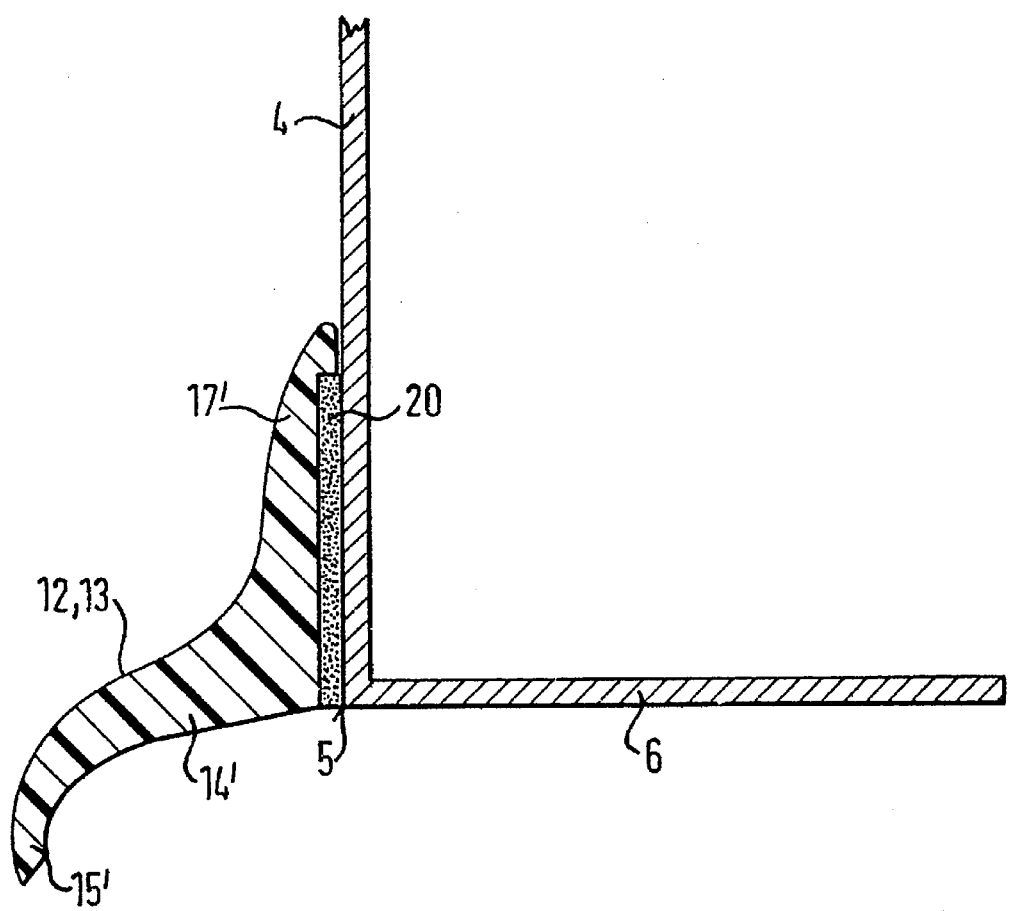
FIG. 4 is a cross sectional representation similar to FIG. 3 but taken at a free end-region of an end-section of the contoured-part arrangement.

Sections 11, 12, 13, which are usually constructed of elastically shapeable, or deformable, resinous plastic, can each have a cross-sectional shape as indicated in FIGS. 3 and 4. This type of cross-section has an upwardly-directed fin 17, an upper end of which forms a radially outer rim of the section. Fin 17 is secured to the side wall 4 of the car body by means of an adhesive layer 20 and has at its free upper end portion a lip which, in the case of this attachment, rests directly against the side wall 4. A lower end of the fin 17 terminates at the car body edge 5. Extending outwardly from the fin 17 is a region 14 whose free end portion 15 is curved toward the rotational axis 2 of the wheel 1, with a surface 16, directed towards the rotational axis 2, extending obliquely outwardly to, thus, get closer to the rotational axis 2 toward its outer end. This shape of surface 16 prevents splash water from escaping from the wheel housing. A lower end of free end portion 15 forms a radially inner rim of the section.

The region 14 of sections 11, 12, 13 of the contoured-part arrangement 10, protruding laterally outwardly from the side wall 4, forms an effective protection of the peripheral region defining the wheel cut-out.

While the contoured-part arrangement 10 depicted in FIG. 1 has only one middle section 11, several strip-shaped middle sections 11 can also be provided, all of which have the same shape so that they can be attached with their ends overlapping one another to form a contoured-part arrangement covering an even larger region of the wheel cut-out.

The end-sections 12 and 13 have the same cross-sectional shape as section 11 and they are also attached in the same manner. At free ends, or outer ends, of the contoured-part arrangement they can, however, be tapered in width, and material thickness, so that there results a reduction in size of the region 14 toward the reduced size of region 14' shown in FIG. 4, and a reduction in the size of the fin 17 toward the reduced size of the fin 17' according to FIG. 4, the end-sections 12, 13 thus ending in tapers. An optically pleasing impression of the whole contoured-part arrangement is thus obtained.

The sections 11, 12, 13 are produced, or molded, with a certain slight curvature, e.g. between 300 mm to 380 mm of a centre line (or middle portion) located between the radially outer rim and the radially inner rim so that they are pre-adapted to the expected curvature of the wheel cut-out about the rotational axis 2 of the wheel 1. Upon mounting, the sections are then brought, or forced, into the actually desired and required shapes by additional elastic deforming, or bending, with the result that contoured-part arrangements for a large number of different types of cars having differently shaped wheel cut-outs can be produced from sections 11 of one shape and optionally correspondingly-developed end-sections 12, 13.

Because the contoured-part arrangement according to the invention is made from strip-shaped sections, which are arranged with their neighboring ends overlapping one another, whereby the material thicknesses of the sections reduce toward their end-regions, preferably tapering toward their free ends, by means of which the end-regions overlapping one another at overlapping tapered junctions for also achieve an overall material thickness which corresponds to that of the individual strip-shaped sections at their middle regions, contoured-part arrangements of the desired type can be formed with a considerably reduced expenditure for molding costs and without specific adaptation to different types of vehicles. Since the sections are produced, or molded, from elastically deformable material and they have a curvature in the direction of their longitudinal extension, these sections, pre-curved to a certain extent, can be attached, with relatively little manual shaping, or bending, to essentially all shapes of wheel cut-outs which exist in practice, by only slightly shaping them elastically additional to their pre-shaping, and thereby adapting them, upon assembly, to an exact shape of a region of a wheel cut-out that is to be covered. It was found that a pre-formed radius of curvature of the centre line (the middle portion between radial outer rim and radial inner rim) of each section of between 300 mm and 380 mm, preferably of between 320 mm and 360 mm, is particularly advantageous. With such a radius of curvature of 340 mm it is possible to accommodate more than 80% of the types of cars presently on the European market with contoured-part arrangements on all four wheel cut-outs using the same shapes of strip-shaped sections.

A particularly simple structure results when all sections of the contoured-part arrangement have the same shape, since then practically all molded parts required in practice can be obtained with just one type of section. End-sections can however be used additionally, the free ends of which, in the assembled state, can have a tapering decorative material thickness and/or tapering width and/or rounding, whereby one type of end-section can form the front end of a contoured-part arrangement on the left-hand side of a vehicle and the rear end of a contoured-part arrangement on the right-hand side of the vehicle, and vice-versa.

Since a region of the contoured-part arrangement protrudes laterally outwardly beyond the outer edge of the car body bordering the wheel cut-out, an effective protection results against impacts of doors of adjacently parked vehicles, which, because the sections of the contoured-part arrangement are made from elastic material, are likewise not substantially damaged in the event of such impacts against them.

The contoured-part arrangement can be attached to the vehicle for example by gluing.

In order to also additionally use the contoured-part arrangement according to the invention to prevent the escape of splash water laterally from the wheel housing, the contoured-part arrangement can have a surface directed towards the wheel which, relative to the longitudinal centre plane of the car, has a smaller distance from the rotational axis of the wheel at a position further away from the center plane than a position closer to the center plane.

The invention claimed is:

1. Contoured-part arrangement to be placed at a wheel cut-out of a car to extend along at least one third of a length of an edge of a car body defining the wheel cut-out, said contoured-part arrangement having an outer region protruding outwardly beyond the edge bordering the wheel cut-out, wherein said contoured-part arrangement comprises a combination of a plurality of strip-shaped sections made from deformable material, which are arranged with their neighboring ends overlapping one another at overlapping tapered junctions, said neighboring ends having opposite mating tapers by means of which they fit together so that the overlapping tapered junctions achieve a material thickness which substantially corresponds to that of the individual strip-shaped sections, said strip-shaped sections further having, in a direction of their longitudinal extension, a pre-formed curvature with a curvature centre line thereof being essentially parallel to a rotational axis of an associated wheel to be housed in said car body at said wheel cut-out.

2. Contoured-part arrangement according to claim 1 wherein said pre-formed curvature has a radius of curvature of the centre line of the pre-formed sections of from 300 mm to 380 mm.

3. Contoured-part arrangement according to claim 2 wherein the radius of curvature is from 320 mm to 360 mm.

4. Contoured-part arrangement according to claim 1 wherein said contoured-part arrangement is formed of a sufficient number of strip-shaped sections to extend along the entire edge bordering the wheel cut-out.

5. Contoured-part arrangement according to claim 1 wherein all sections have the same shape.

6. Contoured-part arrangement according to claim 1 wherein middle strip-shaped sections having neighboring strip-shaped sections at opposite ends thereof have opposite mating tapers at each of opposite ends thereof while end strip-shaped sections, position at the end of the contoured-part arrangement, have an opposite mating taper at one end, neighboring a middle strip-shaped section, and a decorative cross-section which tapers at its other, free, end.

7. Contoured-part arrangement according to claim 1 wherein a partial region is to lie against an outer surface of the car body adjacent the edge defining the wheel cut-out.

8. Contoured-part arrangement according to claim 1 wherein glue is further included for attaching said contoured-part arrangement to said body.

9. Contoured-part arrangement according to claim 1 wherein a surface directed towards the wheel has a smaller distance from a rotational axis of the wheel at a position further from a longitudinal vertical center plane of the car.

10. A car having a contoured-part arrangement to be placed at a wheel cut-out of the car to extend along at least one third of a length of an edge of a car body defining the wheel cut-out, said contoured-part arrangement having an outer region protruding outwardly beyond the edge bordering the wheel cut-out, wherein said contoured-part arrangement comprises a combination of a plurality of strip-shaped sections made from deformable material, which are arranged with their neighboring ends overlapping one another at overlapping tapered junctions, said neighboring ends having opposite mating tapers by means of which they fit together so that the overlapping tapered junctions achieve a material thickness which substantially corresponds to that of the individual strip-shaped sections, said strip-shaped sections further having, in a direction of their longitudinal extension, a pre-formed curvature with a curvature centre line thereof being essentially parallel to a rotational axis of an associated wheel to be housed in said car body at said wheel cut-out.

11. A car having a contoured-part arrangement according to claim 10 wherein said pre-formed curvature has a radius of curvature of the centre line of the pre-formed sections of from 300 mm to 380 mm.

12. A car having a contoured-part arrangement according to claim 11 wherein the radius of curvature is from 320 mm to 360 mm.

13. A car having a contoured-part arrangement according to claim 10 wherein said contoured-part arrangement is formed of a sufficient number of strip-shaped sections to extend along the entire edge bordering the wheel cut-out.

14. A car having a contoured-part arrangement according to claim 10 wherein all sections have the same shape.

15. A car having a contoured-part arrangement according to claim 10 wherein middle strip-shaped sections having neighboring strip-shaped sections at opposite ends thereof have opposite mating tapers at each of opposite ends thereof while end strip-shaped sections, positioned at the end of the contoured-part arrangement, have an opposite mating taper at one end, neighboring a middle strip-shaped section, and a decorative cross-section which tapers at its other, free, end.

16. A car having a contoured-part arrangement according to claim 10 wherein a partial region is to lie against an outer surface of the car body adjacent the edge defining the wheel cut-out.

17. A car having a contoured-part arrangement according to claim 10 wherein glue is further included for attaching said contoured-part arrangement to said body.

18. A car having a contoured-part arrangement according to claim 10 wherein a surface directed towards the wheel has a smaller distance from a rotational axis of the wheel at a position further from a longitudinal vertical center plane of the car.

* * * * *